United States Patent
Stephan

(10) Patent No.: US 6,530,719 B1
(45) Date of Patent: Mar. 11, 2003

(54) GRIPPING AND MANEUVERING APPARATUS

(76) Inventor: George V. Stephan, 6793 N. Graham Rd., Madison, IN (US) 47250

( * ) Notice: Subject to any disclaimer, the term of this patent is extended or adjusted under 35 U.S.C. 154(b) by 0 days.

(21) Appl. No.: 09/724,362

(22) Filed: Nov. 28, 2000

Related U.S. Application Data

(63) Continuation-in-part of application No. 09/621,224, filed on Jul. 21, 2000.

(51) Int. Cl.[7] .......................... B66F 3/24; B23P 19/027; B23P 19/04
(52) U.S. Cl. .......................... 403/364; 403/31; 403/16; 254/133 R; 254/93 R; 29/244; 29/255
(58) Field of Search .......................... 254/133 R, 93 R, 254/89 H; 29/244, 252, 255, 263; 403/364, 16, 31

(56) References Cited

U.S. PATENT DOCUMENTS

| | | | | |
|---|---|---|---|---|
| 116,649 A | * | 7/1871 | Wagnern | 279/106 |
| 190,043 A | * | 4/1877 | Hurd | 279/106 |
| 277,675 A | * | 5/1883 | Buckley | 279/106 |
| 760,041 A | * | 5/1904 | Tauber | 254/23 |
| 1,179,500 A | * | 4/1916 | Brown | 254/29 R |
| 1,269,683 A | * | 6/1918 | Claypool | 254/23 |
| 1,274,685 A | * | 8/1918 | Cline | 279/123 |
| 1,788,542 A | * | 1/1931 | Page | 188/67 |
| 2,333,260 A | * | 11/1943 | Lundius | 226/8 |
| 2,494,166 A | * | 1/1950 | Drissner | 279/106 |
| 2,691,531 A | * | 10/1954 | Grobey | 279/106 |
| 2,712,449 A | * | 7/1955 | Grobey | 279/106 |
| 2,832,604 A | * | 4/1958 | Brusque | 279/119 |
| 3,246,904 A | * | 4/1966 | Judge | 279/123 |
| 3,952,384 A | * | 4/1976 | Goldry et al. | 254/29 R |
| 4,276,685 A | * | 7/1981 | Callahan | 254/29 R X |
| 4,346,945 A | * | 8/1982 | Tsuboi | 384/55 |
| 4,353,561 A | * | 10/1982 | Peterson | 279/106 X |
| 4,786,063 A | * | 11/1988 | Engelhardt et al. | 279/106 |
| 4,838,562 A | * | 6/1989 | Akashi | 279/106 |
| 4,838,849 A | * | 6/1989 | Calari | 279/106 X |
| 4,955,757 A | * | 9/1990 | Balling | 405/184 |
| 5,419,027 A | * | 5/1995 | McPeak et al. | 29/252 |
| 5,820,136 A | * | 10/1998 | Han et al. | 279/131 |
| 6,237,445 B1 | * | 5/2001 | Wesch, Jr. | 81/57.18 |
| 6,290,210 B1 | * | 9/2001 | Horn et al. | 254/34 |

FOREIGN PATENT DOCUMENTS

DE 2611923 A * 9/1977

* cited by examiner

Primary Examiner—Lynne H. Browne
Assistant Examiner—Ernest Garcia
(74) Attorney, Agent, or Firm—Brinks Hofer Gilson & Lione

(57) ABSTRACT

A gripping and maneuvering apparatus is disclosed that includes a housing and a drive unit. The housing includes a plurality of jaws and may be positioned such that the jaws operatively grip a member. The drive unit is coupled to the housing and may be positioned to move the member with respect to an object during operation. The gripping and maneuvering apparatus may further include an internal gripping apparatus that may grip a member and be gripped by the jaws of the housing.

14 Claims, 6 Drawing Sheets

GRIPPING AND MANEUVERING APPARATUS

This application is a Continuation-In-Part of U.S. patent application Ser. No. 09/621,224 filed on Jul. 21, 2000.

FIELD OF THE INVENTION

The present invention relates generally to tools used in construction and maintenance and, more particularly, to a gripping and maneuvering apparatus for securely gripping and moving objects.

BACKGROUND OF THE INVENTION

Fences, signage, utility poles, basketball goals and other similar structures typically involve the use of poles or similar rigid members for structural support. When the structure is constructed or installed upon a surface, such as the soil of the earth, the members are typically inserted into a substrate of the surface to stabilize and anchor the associated structure. Installation of the members into the substrate can involve creating a hole in the surface and the substrate into which the member is inserted. The members can be rigidly maintained in the hole by introducing concrete, plastic, asphalt or other similar adhering material into the hole containing the member therein to bond the member with the surrounding substrate and surface. Installation of the member may also be accomplished by driving the member through the surface and into the substrate or packing the substrate materials around that portion of the member residing in the hole.

When it is desirable to remove or relocate a structure containing members fixedly positioned in the substrate of a surface, the members are also typically removed. Removal of the members and adhering materials bonded thereto requires releasing the bond between the member and the surrounding surface and substrate. This can be accomplished by physical removal of the members and associated adhering material from the surface and substrate. In some instances, it is also desirable to remove the member from the adhering materials. Removal of the adhering materials must typically occur after removal of the member from the substrate.

Removal of members may be accomplished by removing the surrounding surface and substrate materials until the member and adhering materials are exposed. Another possible removal method is by using ropes or chains that may be coupling to the member and to a pulling force such as a vehicle. A third possible removal method is to cut the member below the surface and abandon the lower portion of the member and the adhering materials that are bonded with the substrate. Once a member has been completely removed, removal of the adhering materials typically involves repeated striking or other similar action to break the adhering materials away from the member.

Known problems occur with these methods of member and adhering material removal. Removal of adhering materials from a member is typically time consuming and may cause damage to the member. With regard to member removal, excavation of the substrate surrounding the member and associated adhering materials is also time consuming and results in a large excavated area. Pulling the member from the surface and substrate using a rope or chain can cause danger to humans and equipment since the rope or chain may slip off or break. In addition, the member can be bent, broken off or otherwise damaged thereby prohibiting reuse and possibly requiring further excavation of the surface and substrate to complete the removal. Further, the pulling action can create uncontrolled release of all, or a portion, of the member from the surface and substrate thereby creating a hazard for humans and surrounding structures. Abandonment of a portion of the member results in unwanted subsurface debris as well as the destruction of the member thereby prohibiting reuse.

In addition, some machines or devices include members that are press-fit into position within the device. These members may need to be removed and replaced during repair or maintenance. When removing and replacing these members, it is often desirable to obtain a firm grip on the member and applying force to move the member into or away from the device. Often the amount of pressure needed to get a secure grip on the member is more than can be applied by hands or conventional tools. In addition, applying force in the correct direction without damage to the member or the device may be difficult. As with other methods of removing members, known tools and methods used to remove the members can cause damage to the member and are often difficult and time consuming to use.

Accordingly, there is a need for a gripping apparatus that provides simple, non-destructive, controlled removal and installation of fixedly positioned members.

SUMMARY OF THE INVENTION

The present invention discloses a gripping apparatus operable to grip objects such as members in a non-destructive fashion. In addition, the invention discloses a gripping apparatus that may be used to remove members from both adhering materials and from a surface and substrate. The gripping apparatus also provides for manipulation of members with respect to an object to facilitate installation, removal or repositioning of the member.

One embodiment of the gripping apparatus includes a housing, a plurality of jaws and a plurality of pivot pins. The jaws are positioned on the housing and the pivot pins are fixedly coupled to the housing. The jaws are pivotally coupled to the housing by the pivot pins such that the jaws pivot about the pivot pins. During operation, the housing is positioned such that the jaws pivotally engage a member. When a force is applied to the housing, the jaws are forced into the member thereby gripping the member.

Another embodiment is a gripping apparatus for gripping and moving a member with respect to an object. The gripping apparatus of this embodiment comprises a housing that includes a plurality of jaws and a plurality of pivot pins. The pivot pins are fixedly coupled to the housing. The jaws are pivotally coupled to the housing by the pivot pins. The housing may be positioned such that the jaws become engaged with the member. The gripping apparatus further comprises a drive unit that is fixedly coupled to the housing. The drive unit may be positioned such that during operation of the drive unit, the housing may be moved relative to the object. When the housing is moved with respect to the object, the jaws grip the member and cause the member to move with respect to the object.

Yet another embodiment is a gripping apparatus for gripping an interior surface of a hollow member. The gripping apparatus comprises a gripping shaft that includes a first section coupled with a second section. The second section is tapered to increase in cross sectional area as the second section longitudinally extends away from the first section. The gripping apparatus further comprises a gripping bushing that surrounds a portion of the second section such that the gripping bushing may slide along the second section. The gripping bushing is deformable by the varying cross-sectional area of the second section. The second section may move the gripping bushing outwardly to engage the interior surface of the hollow member.

A gripping system for gripping a hollow member comprises another embodiment. The gripping system comprises an internal gripping apparatus that may be inserted into the hollow member to contact and grip an interior surface of the hollow member. The gripping system further comprises a housing that may be positioned to engage the internal gripping apparatus. The housing includes a plurality of jaws that are pivotally coupled to the housing. The housing may be positioned such that the jaws may engage with the internal gripping apparatus and fixedly coupling the hollow member to the housing. In an alternative embodiment, the housing may be coupled to a drive unit such that operation of the drive unit may move the hollow member.

A method of gripping and moving a member with respect to an object is described by another embodiment. The method comprises positioning a housing to surround a portion of the member. The housing includes a plurality of jaws that are coupled to the housing such that the jaws pivot with respect to the housing. The method further comprises engaging the member with the jaws and moving the housing with a drive unit. The drive unit is coupled to the housing and may be positioned to contact the object and move the member relative to the object when the drive unit is operating.

The present invention also describes a method of gripping an interior surface of a hollow member with a gripping apparatus. The method comprises inserting a second section of a gripping shaft into the hollow member. The second section is tapered to increase in cross sectional area as the second section longitudinally extends away from a first section of the gripping shaft. The method further comprises exerting a force on the first section and deforming a gripping bushing with the second section. The gripping bushing is moved outwardly by the second section to engage an interior surface of the hollow member.

Other features and advantages of the invention will be apparent from the drawings and the more detailed description of the invention that follows. The foregoing discussion of the preferred embodiments has been provided only by way of introduction. This section should not be construed as a limitation on the following claims, which define the scope of the invention.

BRIEF DESCRIPTION OF THE DRAWINGS

FIG. 2c is a partial cross-sectional exploded side view of the hashed portion of one embodiment of the gripping apparatus illustrated in FIG. 2.

DETAILED DESCRIPTION OF THE PRESENTLY PREFERRED EMBODIMENTS

Figure 1:
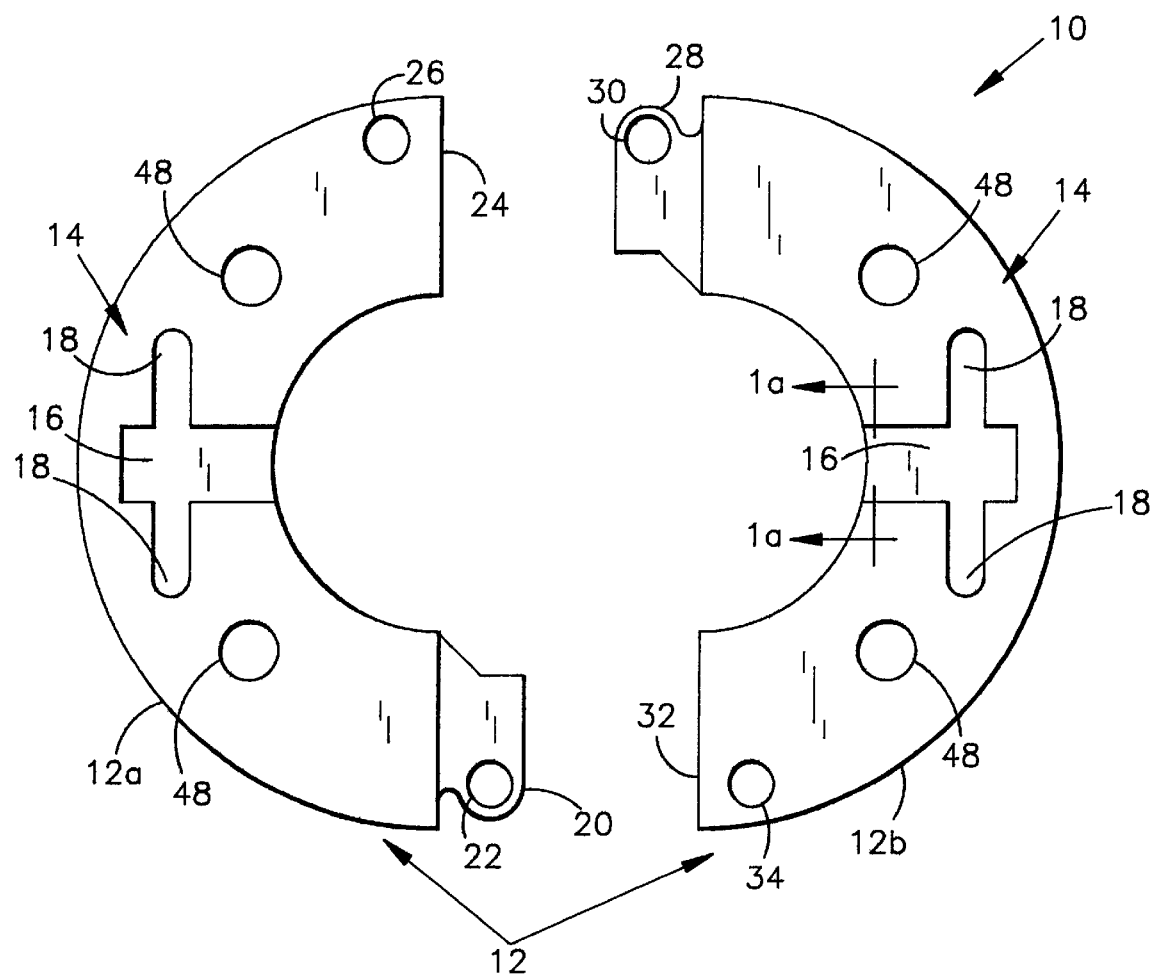
FIG. 1 is a top view of a preferred housing of the gripping apparatus.

Referring to FIG. 1, a portion of a preferred gripping apparatus 10 is illustrated that provides simple, non-destructive, controlled gripping for removal and/or transportation of certain types of members. The preferred gripping apparatus 10 includes a housing 12 that has at least two pivot trays 14. As further illustrated in FIG. 1, the pivot trays 14 have a jaw cavity 16 and a pivot pin notch 18. The preferred housing 12 is circular in shape, however, those skilled in the art would recognize that variations exist on the shape of the housing 12 and that the shape of the housing 12 should not be construed as a limitation of the present invention.

In the preferred embodiment of the present invention, the housing 12 comprises a first housing member 12a and a second housing member 12b. The first housing member 12a includes a first male engagement member 20 that has a first male aperture 22 and a first female engagement member 24 that has a first female aperture 26. The second housing member 12b includes a second male engagement member 28 that has a second male aperture 30 and a second female engagement member 32 that has a second female aperture 34. As set forth in FIG. 2a, when assembled, the engagement members 20, 24, 28, 32 mate together so that the housing 12 forms one complete unit. Although not illustrated in FIG. 1, in alternative embodiments of the present invention the housing 12 may be one complete unit and not two separate members that mate together to form one unit.

Figure 1A:
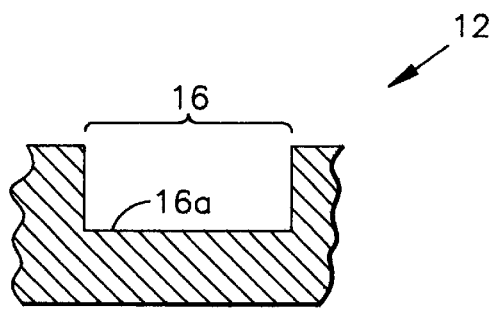
FIG. 1a is a cross-sectional front view of a portion of the jaw cavity located in the housing of the gripping apparatus illustrated in FIG. 1.
Figure 2:
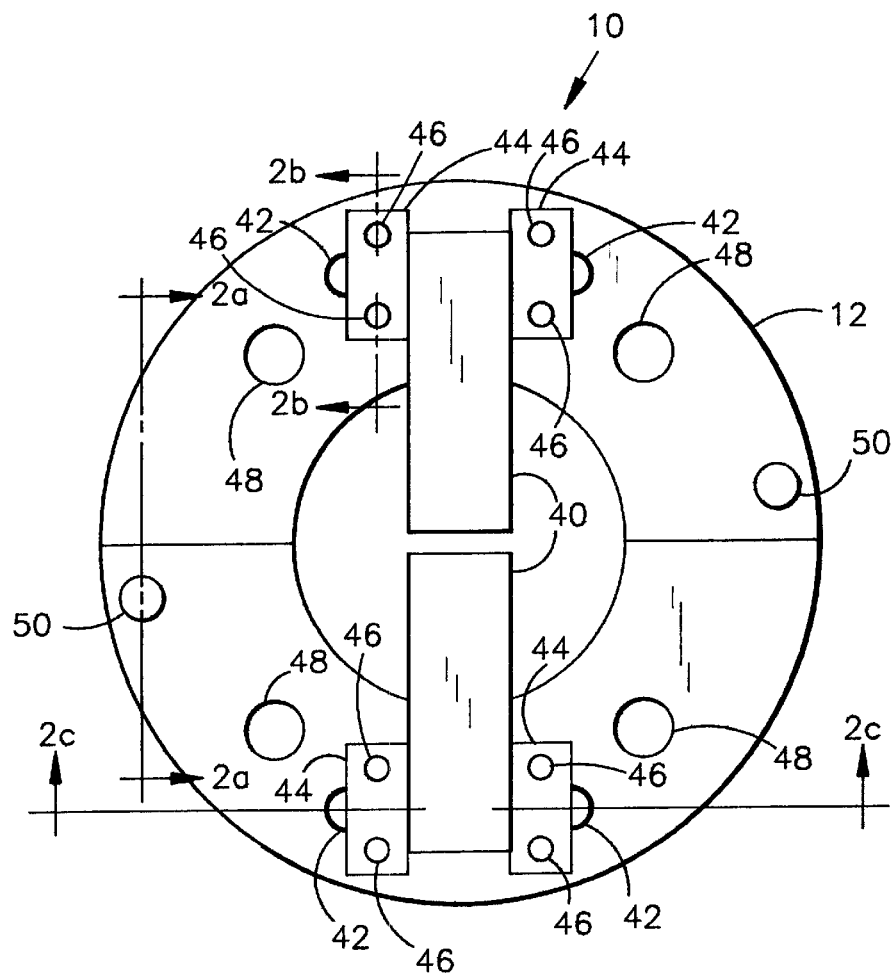
FIG. 2 is a top view of a preferred embodiment of the gripping apparatus.

Referring to FIG. 2, which illustrates a fully assembled gripping apparatus 10, at least two jaws 40 are provided that include a pivot pin 42. In the preferred embodiment, each jaw 40 is positioned in a respective jaw cavity 16 and each pivot pin 42 is positioned in a respective pivot pin notch 18. At least one retaining cap 44 is connected to the housing 12 to secure each pivot pin 42 in a respective pivot pin notch 18, thereby allowing the jaws 40 to pivot in the jaw cavity 16. In the preferred embodiment, a plurality of screws 46 are used to secure the retaining caps 44 to the housing 12, however those skilled in the art would recognize that other fastening devices may be used. Although two retaining caps 44 are illustrated for each jaw 40 in FIG. 2, those skilled in the art would recognize that one retaining cap 44 for each jaw 40 may be used as well, Referring to FIG. 1a, which illustrates a cross-sectional front view of a portion of the housing 12 illustrated in FIG. 1, the preferred jaw cavity 16 is formed as a U-shaped cavity in the housing 12. In the preferred embodiment, the housing 12 is made from steel, or some other similar material, and the jaw cavity 16, as well as the pivot pin notch 18, are machined out of the housing 12. In an alternative embodiment, the pivot pin notch 18 may be raised above the surface of the housing 12, and each of the jaw cavities 16 may be a position on the surface of the housing 12 where the jaws 40 are positioned. Those skilled in the art would recognize that various methods of machining exist and may be used to form the jaw cavity 16 and the pivot pin notch 18 in the housing 12.

In an alternative embodiment, the pivot pin notch 18 may be an aperture (not shown) formed in the housing 12 within the jaw cavity 16. The aperture is formed to receive a portion of the pivot pin 42. The aperture is operable to couple the pivot pin 42 to the housing 12 such that the jaws 40 may pivot in the jaw cavity 16 as in the previously discussed embodiments. The pivot pin 42 of this embodiment may be, for example, a spring pin to facilitate installation and assembly of the jaws 40 within the jaw cavity 16. Since the jaws 40 are maintained in the jaw cavity 16 by the pivot pins, the retaining cap 44 of the previously discussed embodiments is unnecessary.

Referring to FIGS. 1a and 2, a bottom surface 16a of the jaw cavity 16 is used as a stop for the jaws 40. As such, the jaws 40 will stop pivoting once they make contact with the bottom surface 16a of the jaw cavity 16. During operation, if the housing 12 and jaws 40 are placed around a post or pole that is inserted vertically, or some other similar member, upwards force in the housing 12 causes the jaws 40 to clamp down on the member and obtain a firm grip. Downwards pressure on the housing 12 causes the jaws 40 to release pressure, thereby loosening the grip on the member. A plurality of support apertures 48 are included in the housing to allow various devices to be secured to the housing 12 for applying force to the housing 12. Those skilled in the art would recognize that various applications exist for the present invention and that it may be used on objects that are not necessarily vertically inserted as well.

Figures 2A, 2B:
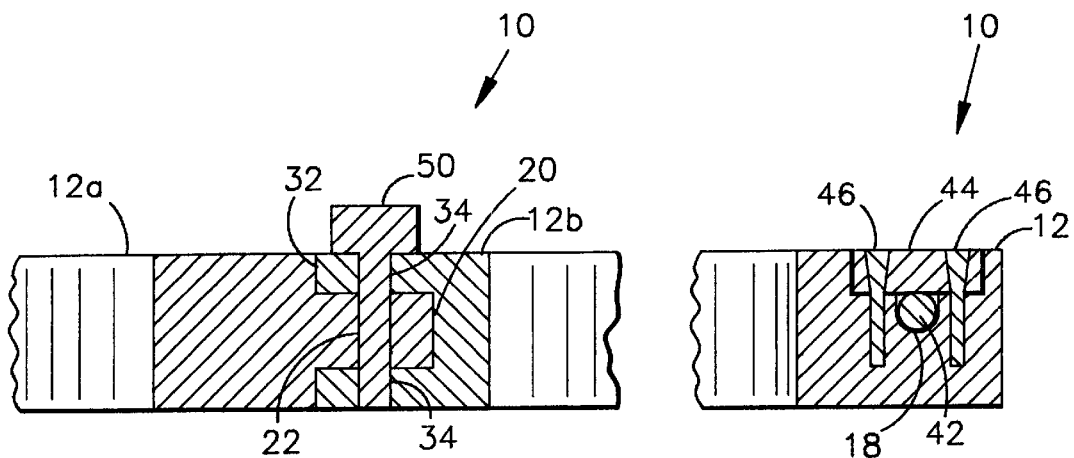
FIG. 2a is a cross-sectional side view of the hashed portion of the gripping apparatus illustrated in FIG. 2.
FIG. 2b illustrates a cross-sectional side view of the hashed portion of the gripping apparatus illustrated in FIG. 2.

Referring to FIG. 2a, which illustrates a cross-sectional view of a portion of the preferred gripping apparatus 10 illustrated in FIG. 2, as previously set forth when the preferred housing 12 is assembled it forms one complete unit. In FIG. 2a, the first male engagement member 20 of the first housing member 12a is illustrated positioned as assembled in the second female engagement member 32 of the second housing member 12b. In the preferred embodiment, the housing members 12a and 12b are held securely in place by a fastening device 50, such as a screw or pin for example, that is placed in apertures 22, 26, 30, 34, respectively. Those skilled in the art would recognize that several fastening devices 50 exist that may be used to secure the housing members 12a and 12b together.

Referring to FIG. 2b, which illustrates a cross-sectional side view of a portion of the gripping apparatus 10 depicted in FIG. 2, in the preferred embodiment the retaining caps 44 are recessed into the housing 12. As such, the retaining caps 44 and the fastening devices 46 are mounted flush with the upper surface of the housing 12. FIG. 2b also illustrates the manner in which the pivot pins 42 are secured in the respective pivot pin notches 18 that are located in the housing 12. As illustrated, when secured to the housing 12 the retaining caps 44 secure the pivot pins 42 in the pivot pin notches 18, thereby allowing the jaws 40 to pivot during operation.

Figure 3:
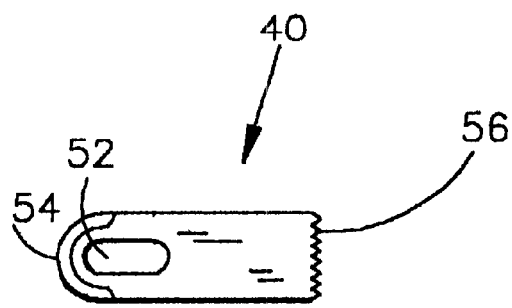
FIG. 3 illustrates a side view of an illustrative preferred jaw.

FIG. 3 depicts a side view of one preferred jaw 40 that may be used in the present invention. As illustrated, in this embodiment the jaw 40 includes a pivot pin aperture 52. The pivot pin aperture 52 allows the pivot pins 42 to easily be placed in the pivot pin notches 18 of the housing 12. Although not illustrated in FIG. 3, the pivot pin 42 may also be included in the jaw 40, which means the pivot pin 42 would be an integral part of the jaw 40.

As further illustrated in FIG. 3, the jaw 40 may include a rounded end 54 and a serrated end 56. The rounded end 54 allows the jaw 40 to easily pivot in the jaw cavity 16 of the housing 12 and the serrated end 56 allows the jaw 40 to obtain a better grip on the member that the gripping apparatus 10 is being used to grip. However, those skilled in the art would recognize that serrated ends 62 are disclosed by way of example only, and that circular, flat and various other ends may be provided on the jaws 40. In addition, those skilled in the art would recognize that the jaws 40 may be manufactured in various lengths, to accommodate different sized members that need to be gripped during operation.

Figure 4:
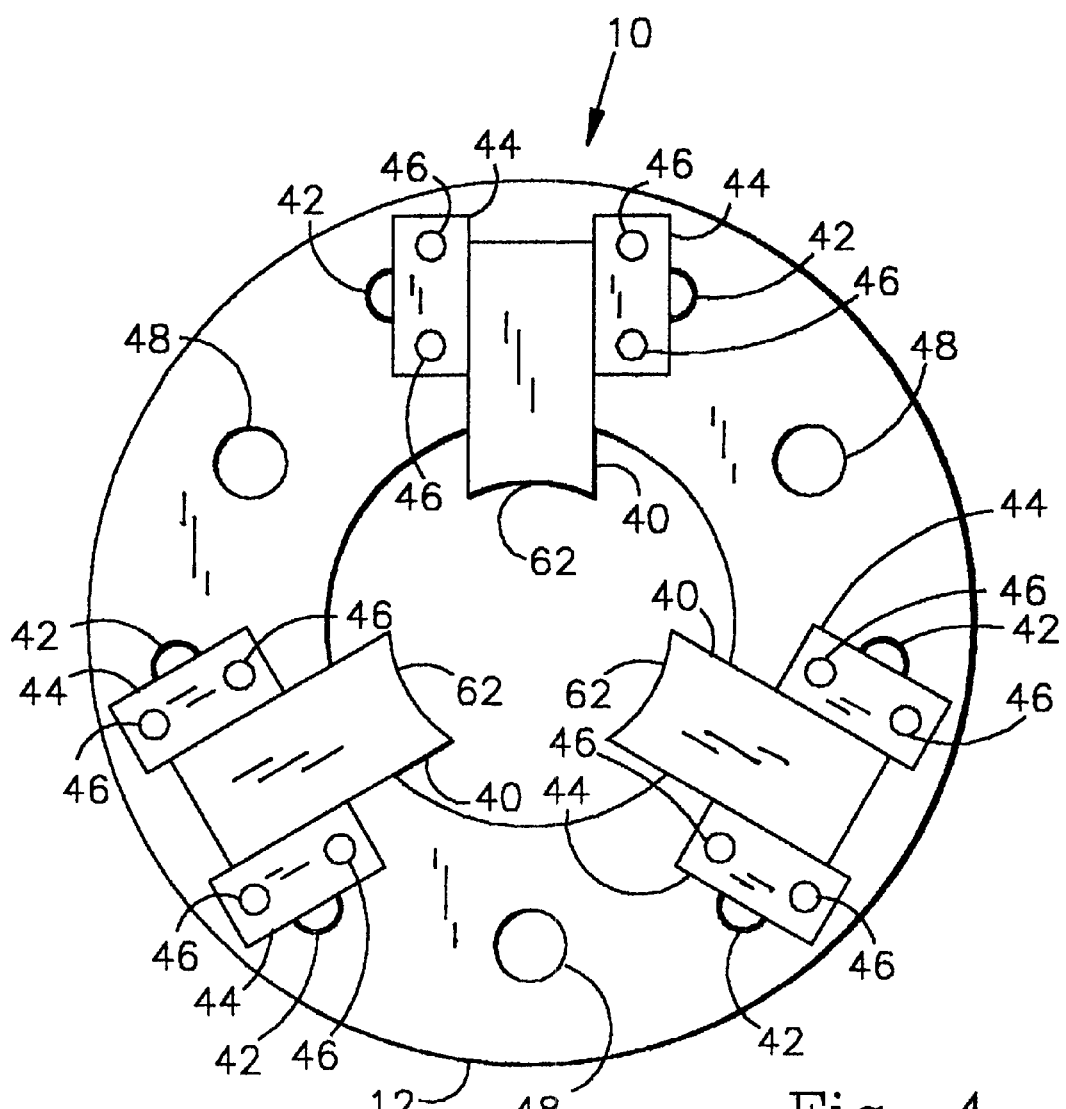
FIG. 4 illustrates another preferred embodiment of a gripping apparatus.

Referring to FIG. 4, another preferred gripping apparatus 10 is illustrated that includes three pivot trays 16. Although this embodiment includes three pivot trays 16, the remaining features of the gripping apparatus 10 remain essentially unchanged from the discussion of the embodiment set forth in FIG. 2. In this embodiment, the center of the jaws 40 are separated by approximately 120° and as illustrated, are preferentially formed with semi-circular ends 62 that are preferentially used to grip round objects and members. As previously set forth, the gripping end of the jaws 40 may be formed in several shapes and configurations, depending upon the particular application.

Figure 5:
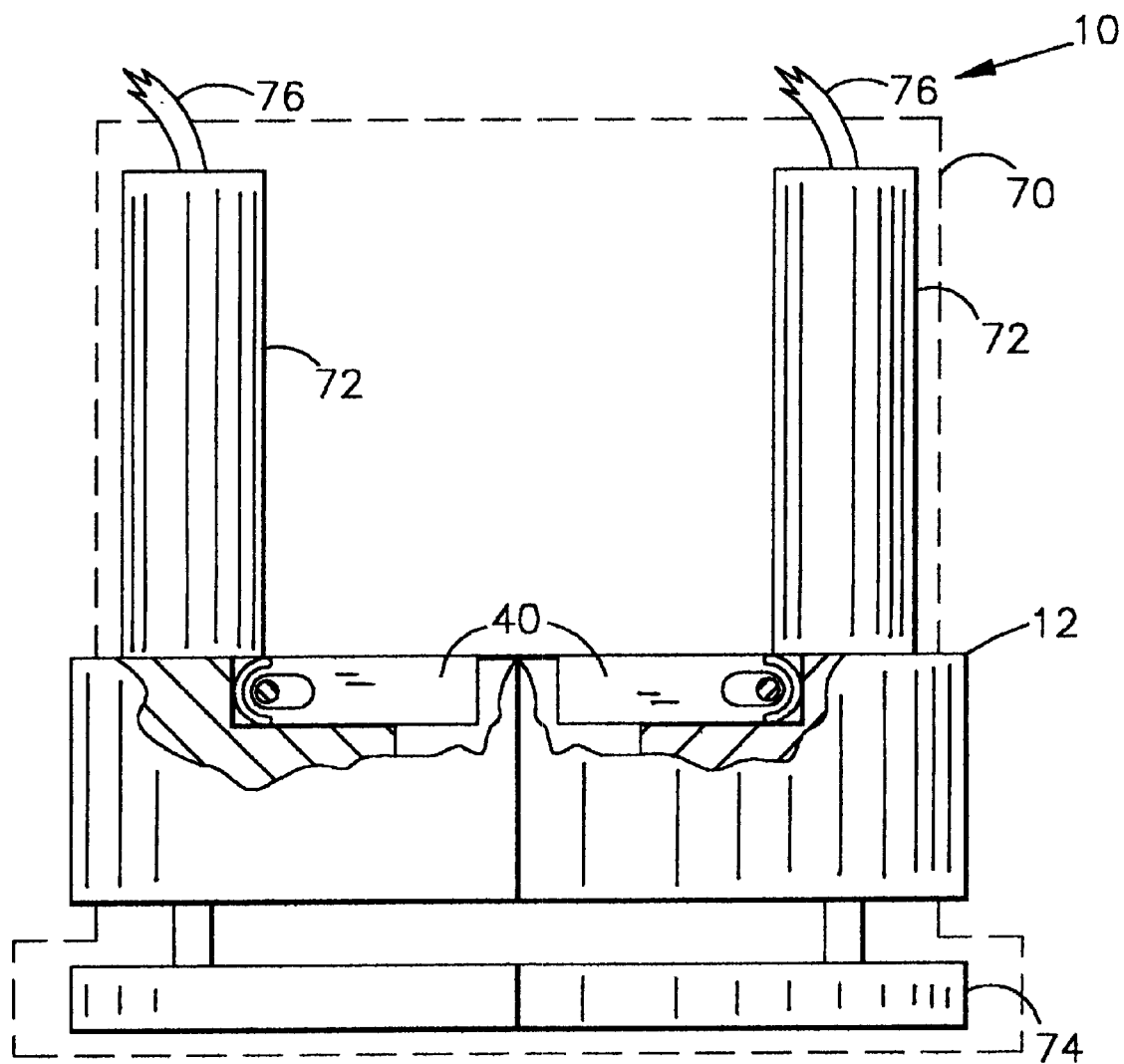
FIG. 5 illustrates a front view of another preferred embodiment of a gripping apparatus.

FIG. 5 illustrates yet another embodiment of the gripping apparatus 10 in a partially cross-sectioned front view. The gripping apparatus 10 includes the housing 12, the jaws 40 and may include any other features associated with the housing 12 of any of the previously discussed embodiments. In addition, the preferred gripping apparatus 10 of this embodiment also includes a drive unit 70. The drive unit 70 includes at least one actuator 72 and at least one stripper plate 74. In the preferred embodiment illustrated in FIG. 5, multiple actuators 72 are uniformly distributed and operatively cooperate with the stripper plate 74. During operation, the actuator 72 is operable to move the stripper plate 74 with respect to the housing 12.

The actuator 72 may be actuated by, for example, hydraulic, pneumatic, jackscrew, pawl-and-ratchet or any other actuation mechanism capable of moving the stripper plate 74. The preferred actuator 72 is actuated hydraulically and includes a hydraulic hose 76 to provide fluid to the actuator 72. The actuator 72 longitudinally extends through the housing 12 and is fixedly coupled to the housing 12 and the stripper plate 74 by threaded connection. In alternative embodiments, welding, nuts and bolts or some other similar fastening mechanism may be used to fixedly couple the actuator 72 to the housing 12 and the stripper plate 74.

The stripper plate 74 may be an annular ring with an outside diameter that is similar to the outside diameter of the housing 12. The stripper plate 74 may include a centrally located aperture (not shown) that may be similar in diameter to the aperture formed by the housing 12. Similar to the previously discussed embodiments of the housing 12, the stripper plate 74 may be two separate members that mate together to form one unit, or may be one complete unit. In an alternative embodiment, the stripper plate 74 may be a plurality of small plates each forming a base plate for one of the actuators 72.

Figure 6:
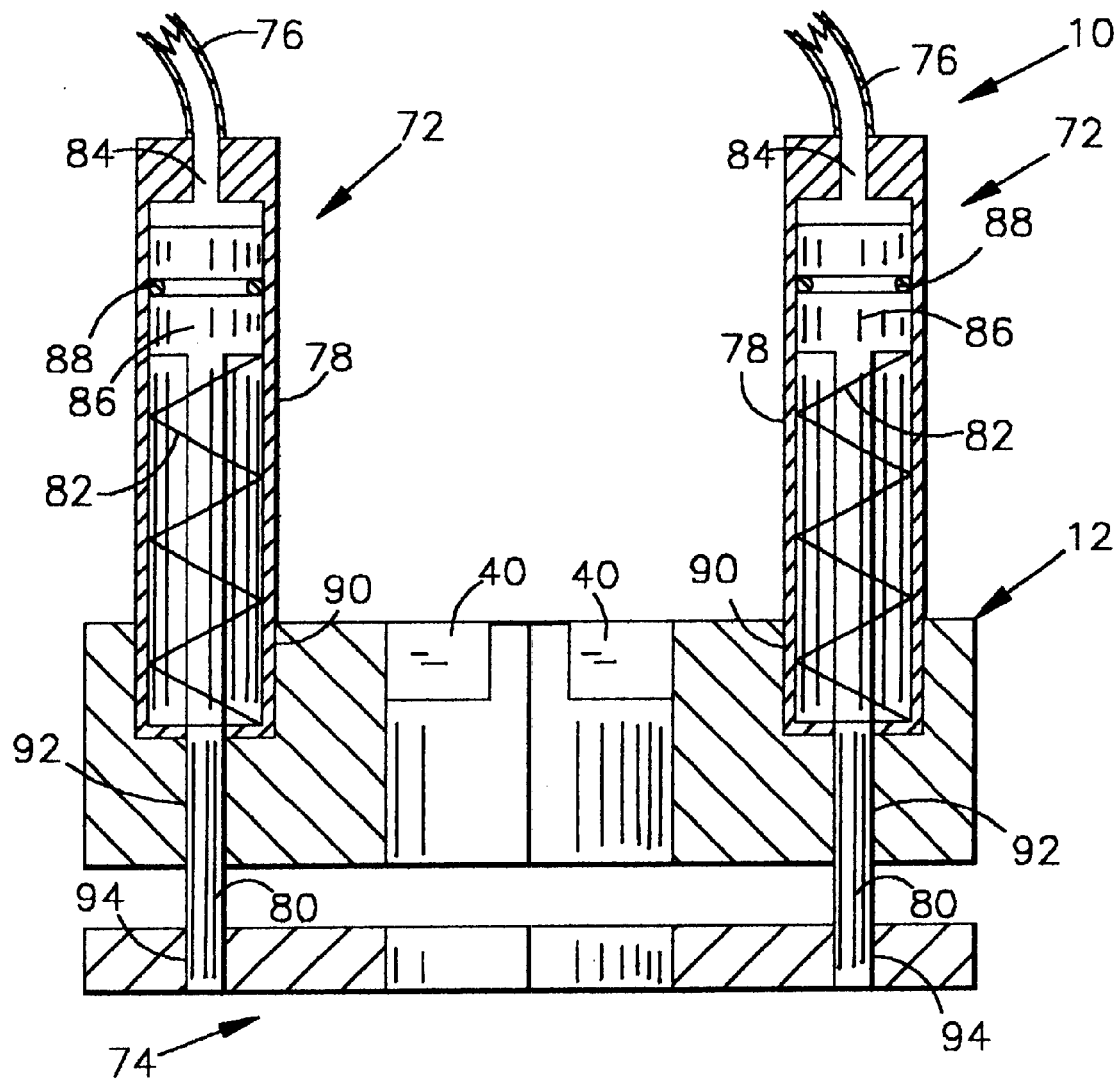
FIG. 6 illustrates a partial cross-sectional view of the gripping apparatus illustrated in FIG. 5.

FIG. 6 is a partial cross-sectional view of the gripping apparatus 10 illustrated in FIG. 5 that includes the housing 12, the jaws 40, the actuator 72 and the stripper plate 74. The actuator 72 includes an actuator cylinder 78, an actuator rod 80 and a coil spring 82. As known in the art, the actuator cylinder 78 is slidably coupled with the actuator rod 80 such that the rod 80 may move longitudinally along the central axis of the actuator 72.

During operation, hydraulic fluid flows into and out of a cavity within the actuator cylinder 78 through the hydraulic hose 76 and a hydraulic inlet 84. The hydraulic fluid acts upon a piston 86 forming one end of the actuator rod 80. An O-ring 88 maintains the hydraulic fluid within the actuator cylinder 78 while allowing the slidable movement of the actuator rod 80. The actuator rod 80 moves to slidably extend further from the actuator cylinder 78 and compress the coil spring 82 when pressurized hydraulic fluid flows into the actuator cylinder 78. Conversely, the coil spring 82 forces the actuator rod 80 to retract when hydraulic fluid is removed from the actuator cylinder 78.

The housing 12 includes a first aperture 90 and a second aperture 92 forming a passageway through the housing 12. The first and second apertures 90, 92 are formed to accept the actuator cylinder 78 and the actuator rod 80, respectively. The actuator cylinder 78 longitudinally extends to fill the first aperture 90. The actuator rod 80 is slidably positioned in the second aperture 92 and extends beyond the housing 12 and into a third aperture 94 located in the stripper plate 74.

Operation of the actuator 72 moves the housing 12 with respect to the stripper plate 74. As such, the gripping apparatus 10 of this embodiment is operable to manipulate a member in a plurality of modes that include an extraction mode, a coupling mode and a lifting mode. During operation in the extraction mode, the gripping apparatus 10 may be positioned to grip a member such as, for example, a fence post (not shown). The stripper plate 74 may be positioned adjacent an object such as, for example concrete (not shown) that the member is coupled with. When the drive unit 70 is activated, the member is gripped by the housing 12 and extracted from the object. Extraction occurs as the stripper plate 74 is moved away from the housing 12 thereby moving the member away from the object.

In an operation using the coupling mode, an object, such as, for example a bearing (not shown), may be pressed onto a member such as, for example, a bearing shaft (not shown). In this operation, the member is gripped by the gripping apparatus 10 and extends beyond the stripper plate 74. The object is placed, for example, to surround the member and be contacted by the stripper plate 74. As the stripper plate 74 is moved away from the housing 12, the object is pressed onto that portion of the member that extends beyond the stripper plate 74.

In an operation using the lifting mode, the gripping apparatus 10 is operable to grip a member, such as, for example a steel rod (not shown). The stripper plate 74 may be placed on a surface such as, for example, the ground (not shown). The stripper plate 74 may be positioned such that the member is adjacent an object to be lifted from the surface, such as for example, a vehicle (not shown). As the stripping plate 74 is actuated to move away from the housing 12, the member moves toward the object thereby lifting the object from the surface. The gripping apparatus 10 of this embodiment may provide similar functionality in other modes of operation and the above exemplary modes should not be construed as a limitation.

Another embodiment of the gripping apparatus 10 includes the housing 12, the drive unit 70 and an internal gripping apparatus 100. The housing 12 and the drive unit 70 may include the features of the previously discussed embodiments. As such, the operability of the housing 12 and the drive unit 70 are similar to the previously discussed embodiments. In this embodiment of the gripping apparatus 10, the housing 12 is operable to grip the internal gripping apparatus 100 using the jaws 40 (illustrated in FIGS. 2A, 3 and 4) when moved by the drive unit 70. An alternative embodiment that includes the internal gripping apparatus 100 includes the housing 12 without the drive unit 70.

Figure 7:
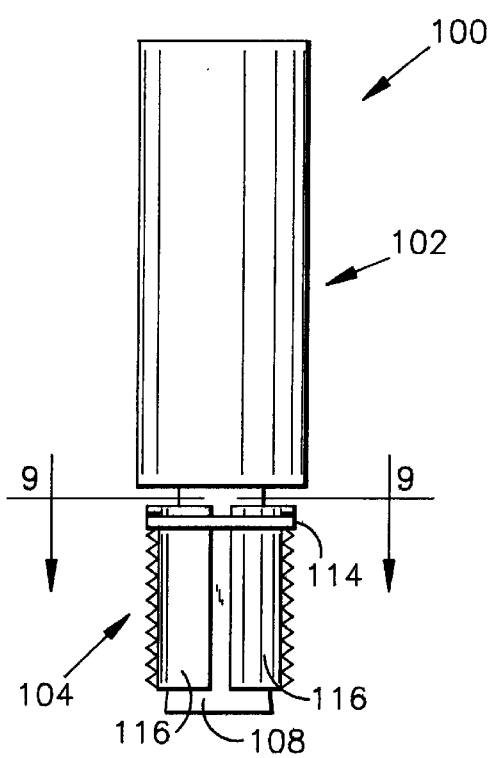
FIG. 7 illustrates a front view of another preferred embodiment of a portion of a gripping apparatus.

FIG. 7 illustrates an embodiment of the preferred internal gripping apparatus 100. The internal gripping apparatus 100 includes a gripping shaft 102 and a gripping bushing 104. The gripping bushing 104 is slidably coupled to the gripping shaft 102 as will be hereinafter described. The internal gripping apparatus 100 is operable to grip a hollow member, such as, for example, a fence post or any other member that includes a cavity therein. The internal gripping apparatus 100 may be operably inserted into a cavity formed in the hollow member. When a force is applied to the internal gripping apparatus 100 in the direction opposite to the direction of insertion, the internal gripping apparatus 100 is operable to grip an interior surface of the hollow member as will be hereinafter described.

Figure 8:
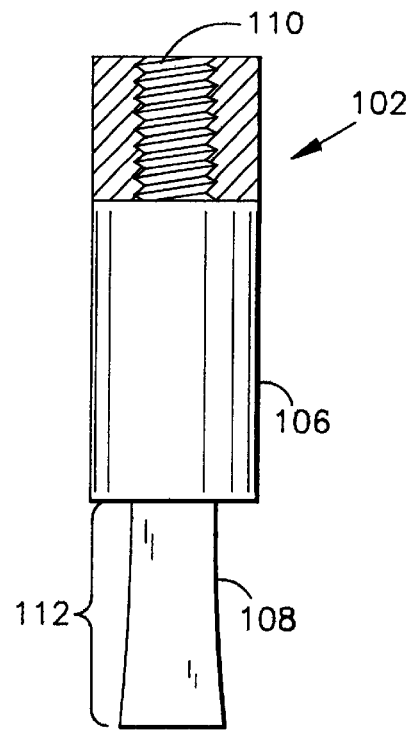
FIG. 8 illustrates a partial cross-sectional view of a preferred embodiment of a gripping shaft that forms part of the portion of a gripping apparatus illustrated in FIG. 7.

FIG. 8 depicts the gripping shaft 102 illustrated in FIG. 7 partially cross-sectioned with the gripping bushing 104 removed. The gripping shaft 102 has a first section 106 and a second section 108 and may be formed of steel, iron or some other similar rigid material. The first and second sections 106, 108 may be integrally formed, or fixedly coupled by threaded connection, welding or similar connection mechanism. The first section 106 may be a coupling mechanism formed to resemble a member that may be gripped by the housing 12.

In an alternative embodiment, the first section 106 may be formed to include a support aperture 110 for applying force to the internal gripping apparatus 100. The support aperture 110 may be a threaded connection, a hook, a lug or some other similar coupling mechanism that will allow various devices to be secured to the internal gripping apparatus 100. In this alternative embodiment, the housing 12 and/or the drive unit 70 are not necessary for operation of the internal gripping apparatus 100.

As illustrated in FIG. 8, the second section 108 of the preferred internal gripping apparatus 100 includes a tapered portion 112. The tapered portion 112 has a smaller cross-sectional area near the first section 106 that increases as the second section 108 longitudinally extends away from the first section 106. In other words, the largest cross-sectional area of the second section 108 is farthest away from the first section 106.

Referring again to FIG. 7, the preferred gripping bushing 102 includes an O-ring 114 and a plurality of gripping members 116. The O-ring 114 is an annular ring formed of rubber, silicone or some other similar rubberized material capable of being expanded to elastically surround and compressably hold the gripping members 116. The gripping members 116 are formed of iron, steel or some other similar rigid material. The gripping members 116 are formed to longitudinally extend and partially surround a portion of the second section 108 (FIG. 8) of the gripping shaft 102.

Figure 9:
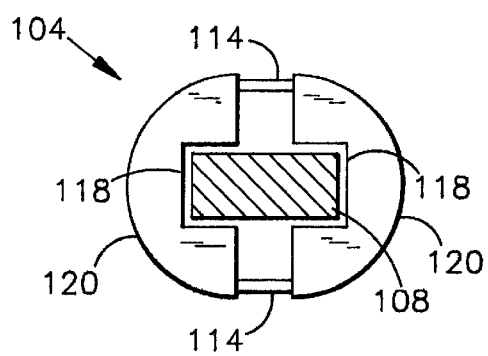
FIG. 9 illustrates cross sectional top view of the portion of a gripping apparatus illustrated in FIG. 7 cut along lines 9—9.

FIG. 9 is a cross-sectional view of the internal gripping apparatus 100 illustrating the position of the gripping bushing 104 with respect to the second section 108. The preferred gripping bushing 104 includes two gripping members 116 that each include a slot 118 formed to surround a portion of the second section 108. The slot 118 is formed with a taper surface (not shown) formed to contact the tapered surface 112 (FIG. 8) of the second section 108. The O-ring 114 holds the gripping members 116 in slidable contact with the tapered surface 112 of the second section 108.

An outer surface 120 of the gripping members 116 is formed to operatively contact a member (not shown). In the embodiment illustrated, the outer surface 120 of the gripping members 116 form a semi-circular shape capable of insertion into cavities of various shapes, such as, for example, a cylindrically shaped cavity. In alternative embodiments, the outer surface 120 of the gripping members 116 may be formed in other shapes conducive to operation of the internal gripping apparatus 100.

Figure 10:
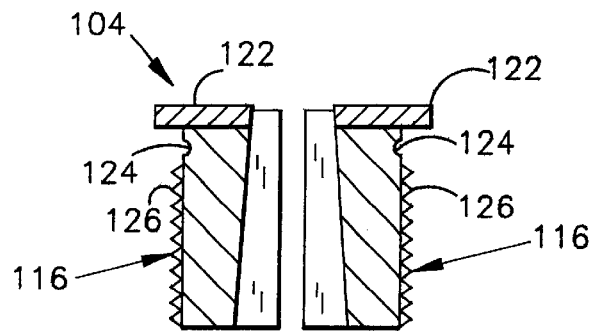
FIG. 10 illustrates a cross sectional front view of a preferred embodiment of a gripping bushing that forms part of the portion of a gripping apparatus illustrated in FIG. 7.

FIG. 10 is a cross-sectional view of the gripping bushing 104 illustrated in FIG. 7 that has been removed from the gripping shaft 102 for illustrative purposes. In addition, the O-ring 114 has been removed. The gripping members 116 each include an alignment ridge 122, a groove 124 and a gripping surface 126. The alignment ridge 122 may be integrally formed or fixedly connected with the remainder of the gripping member 116 by welding or some other similar rigid connection mechanism. The alignment ridge 122 may provide alignment of the internal gripping apparatus 100 when the gripping apparatus 100 is inserted into a cavity within a member (not shown).

The groove 124 is formed to accept the O-ring 114 (not illustrated in FIG. 10). The groove 124 maintains the position of the O-ring 114 on the gripping members 116 during operation of the internal gripping apparatus 100. The gripping surface 126 is formed to provide improved gripping performance of the internal gripping apparatus 100. The gripping surface 126 of the illustrated embodiment forms a serrated edge, however, in alternative embodiments, ridges, grooves, texture or any other surface configuration may be used that improves gripping performance.

Referring now to FIGS. 7, 8, 9 and 10, the cooperative operation of the internal gripping apparatus 100 with the remainder of the gripping apparatus 10 will be explained. During operation, the internal gripping apparatus 100 may be inserted into a cavity within a member. Example members may be a hollow pipe forming a fence post, a bearing pressed into a race, or any other member that includes a cavity. The second section 108 of the internal gripping apparatus 100 may be inserted into a cavity within a member coupled to an object. Upon insertion, the gripping members 116 are positioned adjacent to the interior surface of the cavity. The housing 12 may then be positioned to surround and engage the first section 106 of the internal gripping apparatus 100. In addition, the drive unit 70 may be positioned to contact the object.

When the drive unit 70 is activated the housing 12 subjects the internal gripping apparatus 100 to a force opposite to the direction of insertion. The force causes the gripping bushing 104 to slide along the tapered section 112 away from the first section 106. As the gripping bushing 104 slides, the O-ring 122 may elastically expand, as the tapered section 112 forces the gripping members 116 outward. In addition, the gripping surface 126 is forced into the interior surface of the cavity thereby gripping the member. Those skilled in the art would recognize that various operations may be performed with this embodiment of the gripping apparatus 10 and that the example operation discussed should not be construed as a limitation.

The previously discussed embodiments of the gripping apparatus 10 provide the ability to grip and maneuver a member. This ability allows the manipulation of members without damage. In addition, the gripping apparatus 10 allows efficient installation and extraction of members from objects. Further, the gripping apparatus 10 provides a versatile device capable of securely gripping a plurality of different sizes and shapes of members.

While the invention has been described in its currently best known modes of operation and embodiments, other modes and embodiments of the invention will be apparent to those skilled in the art and it is the following claims, including all equivalents, that are intended to define the spirit and scope of the invention.

What is claimed is:

1. A gripping apparatus for gripping and moving a member with respect to an object, comprising:
   a housing including a plurality of jaws and a plurality of pivot pins, said pivot pins coupled to said housing with a retaining cap, wherein said jaws are pivotally coupled to said housing by said pivot pins and said housing is positionable such that said jaws are engageable with said member; and
   a drive unit fixedly coupled to said housing, wherein said drive unit is operably positionable to move said housing relative to said object.

2. The gripping apparatus of claim 1, wherein said drive unit comprises an actuator and a stripper plate.

3. The gripping apparatus of claim 2, wherein said actuator is a hydraulic actuator.

4. The gripping apparatus of claim 1, wherein each of said jaws is positioned in a pivot tray.

5. A gripping apparatus for gripping and moving a member with respect to an object, comprising:
   a housing formed with a plurality of jaw cavities;
   a plurality of jaws, wherein each of said jaws is disposed in one of said jaw cavities;
   a plurality of pivot pins operable to detachably couple said jaws to said housing such that each of said jaws may pivot about said pivot pins within said jaw cavities in order to grip a member;
   an actor coupled with said housing; and
   a stripper plate coupled with said actuator, wherein said actuator is operable to move said stripper plate with respect to said housing in order to move said member with respect to an object positioned adjacent said stripper plate.

6. The gripping apparatus of claim 5, wherein said actuator is a hydraulic actuator.

7. The gripping apparatus of claim 5, wherein each of said jaw cavities include a bottom surface, said bottom surface operable to stop each of said jaws from further pivoting upon contact with said bottom surface.

8. The gripping apparatus of claim 5, wherein said actuator is operable to move said stripper plate away from said housing to extract said member from said object.

9. The gripping apparatus of claim 5, wherein said actuator is operable to move said stripper plate away from said housing to engage said member with said object.

10. The gripping apparatus of claim 5, wherein said jaws each include a rounded end and a serrated end, the rounded end formed to allow each of said jaws to freely pivot within said respective jaw cavity, said serrated end operable to engage said member.

11. A gripping apparatus for gripping and moving a member with respect to an object, comprising:
   a housing that includes a first housing member, a second housing member and a plurality of jaw cavities, wherein said first housing member includes a male engagement member and said second housing member includes a female engagement member, said female engagement member detachably coupled with said male engagement member;

a plurality of jaws each disposed in a respective jaw cavity and pivotally coupled with said housing in order to grip a member;

a first actuator and a second actuator couple with said respective first and second housing members; and a first stripper plate member couple with said first actuator and a second stripper plate member coupled with said second actuator.

12. The gripping apparatus of claim 11, wherein the male engagement member and the female engagement member are detachably coupled by a pin.

13. The gripping apparatus of claim 11, wherein said jaws are pivotally coupled with said housing by a plurality of pivot pins, each of said pivot pins operable to engage an aperture in said housing and a pivot pin aperture in each of said jaws.

14. The gripping apparatus of claim 11, wherein said first and second actuators are operable to concurrently move said first and second stripper plate members with respect to said housing in order to move said member with respect to an object positioned adjacent said first and second stripper plates.

* * * * *

UNITED STATES PATENT AND TRADEMARK OFFICE
CERTIFICATE OF CORRECTION

PATENT NO.    : 6,530,719 B1
DATED         : March 11, 2003
INVENTOR(S)   : George V. Stephan It is certified that error appears in the above-identified patent and that said Letters Patent is hereby corrected as shown below:

Column 10,
Line 39, change "actor" to -- actuator --

Signed and Sealed this

Twelfth Day of August, 2003

JAMES E. ROGAN
*Director of the United States Patent and Trademark Office*